(12) United States Patent
Tsuchida

(10) Patent No.: US 8,600,449 B2
(45) Date of Patent: Dec. 3, 2013

(54) MOBILE COMMUNICATION DEVICE, DISPLAY METHOD, AND DISPLAY PROGRAM OF MOBILE COMMUNICATION DEVICE

(75) Inventor: Makoto Tsuchida, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/115,799

(22) Filed: May 25, 2011

(65) Prior Publication Data

US 2011/0294550 A1 Dec. 1, 2011

(30) Foreign Application Priority Data

May 25, 2010 (JP) .................................. 2010-119351

(51) Int. Cl.
| | |
|---|---|
| H04M 1/00 | (2006.01) |
| H04M 3/00 | (2006.01) |
| H04M 1/663 | (2006.01) |
| H04B 1/38 | (2006.01) |
| G06F 3/033 | (2013.01) |
| G06F 5/08 | (2006.01) |
| G09G 5/00 | (2006.01) |

(52) U.S. Cl.
USPC ........ 455/566; 455/418; 455/412.1; 345/158; 345/659; 715/863

(58) Field of Classification Search
USPC .............. 455/566, 418, 412.1; 345/173, 659, 345/168, 158; 715/863
See application file for complete search history.

(56) References Cited

U.S. PATENT DOCUMENTS

| | | | |
|---|---|---|---|
| 2005/0210417 A1* | 9/2005 | Marvit et al. | 715/863 |
| 2010/0156796 A1* | 6/2010 | Kim et al. | 345/168 |
| 2010/0222046 A1* | 9/2010 | Cumming | 455/418 |

FOREIGN PATENT DOCUMENTS

JP 2007-208445 A 8/2007

* cited by examiner

*Primary Examiner* — Opiribo Georgewill
(74) *Attorney, Agent, or Firm* — Procopio, Cory, Hargreaves & Savitch LLP

(57) ABSTRACT

A mobile communication device has a housing, a communication part, a display part, a detection part, and a control part. The communication part transmits and receives messages. The display part displays a first message, or a second message that is related to the first message. The detection part detects a change in the state of the housing. The control part that displays the second message on the display part in the display direction that is different from the display direction of the first message in case in which the detection part detects a change in the state of the housing when the display part displays the first message.

20 Claims, 17 Drawing Sheets

Fig. 5A

```
Hello.                          ~50
Sorry for the delay in
my response.
>according    to   the
weather forecast, it will
rain.
                                ~52
Is that right!?
I'm pretty shocked...

>Let's make sure that we
keep ourselves warm so
as not to catch cold.
To keep myself from
catching cold, I'll wear
my new coat.
```

```
■ Main text of the outgoing e-
  mail
─────────────────────────
Is that right!?                ~54
I'm pretty shocked...

>Let's make sure that we
keep ourselves warm so as
not to catch cold
To keep myself from
catching cold, I'll wear my
new coat.
─────────────────────────
[Character]  [Menu]
```

Fig. 8A

Hello.
Sorry for the delay in my response. ~70

>according to the weather forecast, it will
rain.
Is that right!?
I'm pretty shocked... ~72

To keep myself from catching cold, I'll wear my new coat.

■ Main text of the outgoing e-mail rain. ~74
Is that right!?
I'm pretty shocked...

To keep myself from catching [cold], I'll wear my new coat.

[Character] [Menu]

MOBILE COMMUNICATION DEVICE, DISPLAY METHOD, AND DISPLAY PROGRAM OF MOBILE COMMUNICATION DEVICE

CROSS-REFERENCE TO RELATED APPLICATION

The present application claims priority under 35 U.S.C. §119 to Japanese Patent Application No. 2010-119351, filed on Mar. 25, 2010, entitled "MOBILE COMMUNICATION DEVICE AND DISPLAY METHOD". The content of which is incorporated by reference herein in its entirety.

FIELD

The present invention relates to a mobile communication device that transmits and receives electronic mails and an image display method that displays messages.

BACKGROUND

Mobile communication devices such as mobile phones, comprising a message communication function that transmits and receives messages, are known. For example, mobiles phones, in which multiple messages subjected to previously defined specific key operations or message processing operations are deployed and displayed respectively on a display part, are known. As another example, mobile phones in which incoming messages can be viewed while composing messages for transmission by displaying multiple messages simultaneously on the display part, are also known.

SUMMARY

A mobile communication device has a housing, a communication part, a display part, a detection part, and a control part. The communication part transmits and receives messages. The display part displays a first message, or a second message that is related to the first message. The detection part detects a change in the state of the housing. The control part that displays the second message on the display part in the display direction that is different from the display direction of the first message in case in which the detection part detects a change in the state of the housing when the display part displays the first message.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 5A is an explanatory diagram showing one example of the full text of an outgoing message.

FIG. 5B is an explanatory diagram showing the state in which the outgoing message shown in FIG. 5A is displayed on the mobile communication device.

FIG. 8A is an explanatory diagram showing one example of the full text of the outgoing message.

FIG. 8B is an explanatory diagram showing the state in which the outgoing message shown in FIG. 8A is displayed on the mobile communication device.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, an information device. Embodiments of the disclosure, however, are not limited to such mobile information devices, and the techniques described herein may also be utilized in other applications. For example, embodiments may be applicable to mobile communication devices, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Below, embodiments according to the present invention are described with reference to the figures. However, the present invention is not limited to the following explanation. For example, the application scope of the present invention is not limited to mobile phones, but is also applicable to various mobile communication devices comprising an message (which is e-mail, or short message service etc.) transmitting and receiving function. For example, the present invention is applicable to, for example, PHSs (Personal Handyphone System), PDAs, game machines, etc.

Figure 1:
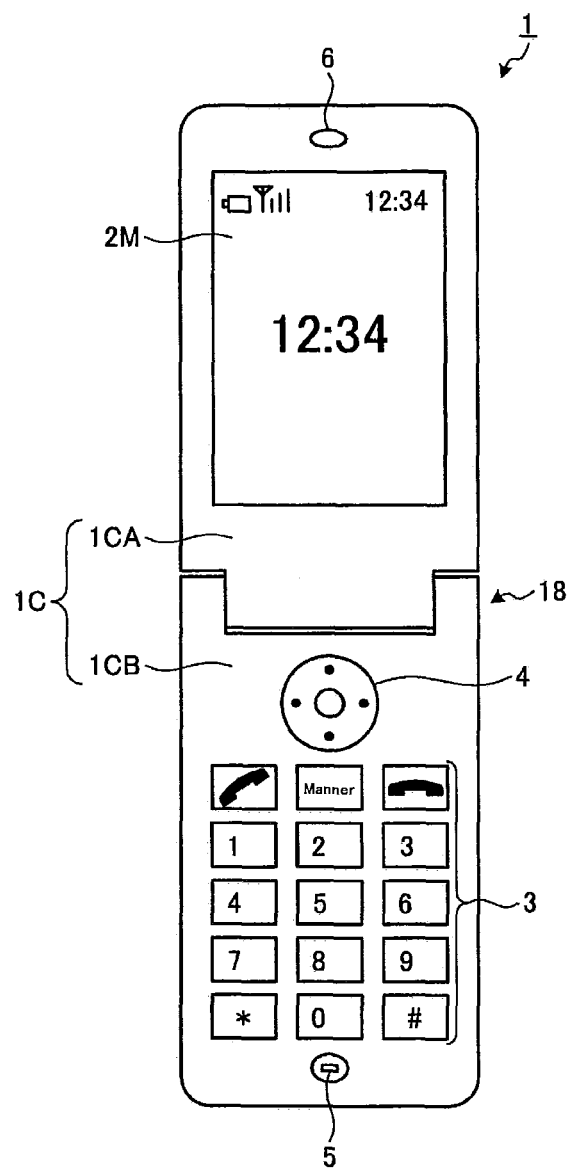
FIG. 1 is a front view showing the schematic configuration of one embodiment of the mobile communication device, which is one example of the mobile communication device.

FIG. 1 is a front view showing the schematic configuration of one embodiment of the mobile communication device. A mobile communication device 1 is a mobile phone comprising a wireless communication function. The mobile communication device 1 is a folding-type mobile phone, which is openable and closeable. FIG. 1 shows the state in which the mobile communication device 1 is open.

The mobile communication device 1 comprises a housing 1C. The housing 1C comprises a first housing 1CA and a second housing 1CB. A main display 2M is provided as a display part in the first housing 1CA. The main display 2M, as a predefined image, displays an idle screen during the state in which the mobile communication device 1 is awaiting incoming calls/messages, and displays a menu screen that is used to supplement operations of the mobile communication device 1. A receiver 6 that emits a sound during a call using the mobile communication device 1 is provided in the first housing 1CA.

Multiple operation keys 3 for inputting a telephone number of an intended party and for inputting characters when composing messages are provided in the second housing 1CB. A dedicated key 4 for easily executing selection and determination of the menu displayed on the main display 2M, for executing screen scrolling, etc. is provided in the second housing 1CB. The operation keys 3 and the dedicated key 4 constitute an operation part 28 (refer to FIG. 2) of the mobile communication device 1. A microphone 5 for receiving sounds during a call using the mobile communication device 1 is provided in the second housing 1CB.

The first housing 1CA and the second housing 1CB are connected by a hinge 18. Therefore, the first housing 1CA and the second housing 1CB can be opened or closed by rotating together around the hinge 18.

Figure 2:
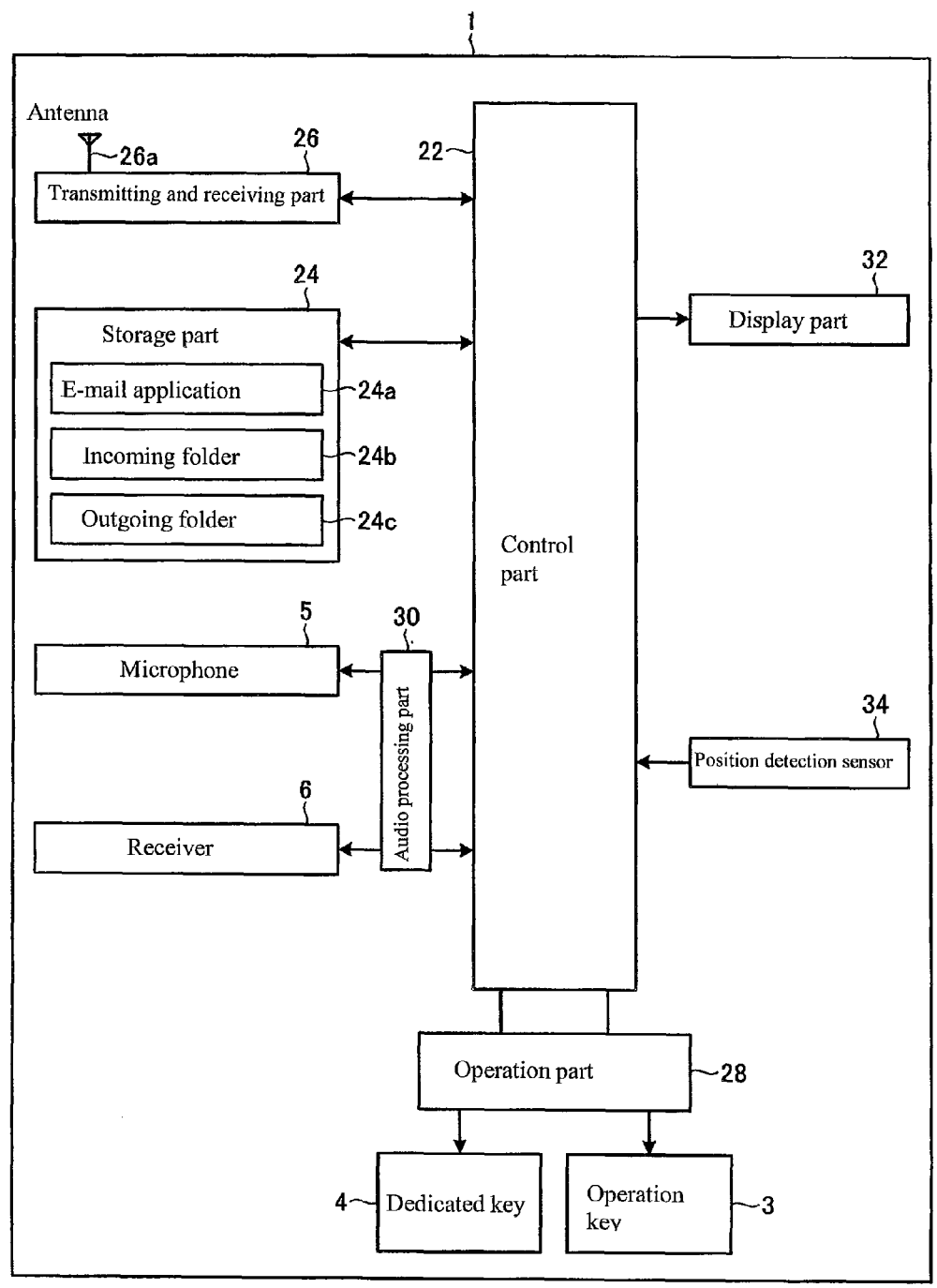
FIG. 2 is a block diagram showing the schematic configuration of the function of one embodiment of the mobile communication device.

Next, a schematic configuration of the functions of the mobile communication device is described. FIG. 2 is a block diagram showing the schematic configuration of the functions of one embodiment of the mobile communication device. As shown in FIG. 2, the mobile communication device 1 comprises a control part 22, a storage part 24, a transmitting and receiving part 26, the operation part 28, an audio processing part 30, a display part 32, and a position detection sensor 34.

The control part 22 is a processing part that controls the overall operation of the mobile communication device 1, and is, for example, a CPU (Central Processing Unit). That is, the control part 22, according to the operation of the operation part 28 and the software stored in the storage part 24 of the mobile communication device 1, executes various processing of the mobile communication device 1 using appropriate procedures. In order to execute this various processing, the control part 22 controls the operation of the transmitting and receiving part 26, the display part 32, etc. The control part 22 executes the processing based on a program (for example, an operating system program, an application program, etc.) that is stored in the storage part 24. The control part 22 can perform multiple programs (application, software) in parallel.

Programs and data for applications used for processing at the control part 22 are stored in the storage part 24. Specifically, a message application 24a, an incoming folder 24b, and an outgoing folder 24c are stored in the storage part 24. The message application 24a is an application program that performs transmitting and receiving of messages. The incoming folder 24b is a folder (storage area) that stores data from incoming messages received by the mobile communication device 1. The outgoing folder 24c is a folder that stores data from sent or unsent outgoing messages. Various information related to messages, such as the subject of the messages, text data of the content of the messages, as well as, the date and time of transmission and receipt, receiver information, attachment data information, and information regarding links of the attached data, are stored in the incoming folder 24b and the outgoing folder 24c.

In addition to the abovementioned data, as the application program, an application program that performs internet communications, an application program that plays audio data, an application program that performs transmission, receiving, and communication processing, an application program that performs one segment broadcasting, etc., are stored in the storage part 24. In terms of data, image data, audio data, dictionary data for converting into characters, an address book, etc., are also stored.

The transmitting and receiving part 26 comprises an antenna 26a which, through the channels allocated by the base station, establishes wireless signal lines with the base station, using the CDMA method, etc., and performs telephone calls and information communications with the base station.

The operation part 28 comprises the operation keys 3 and the dedicated key 4 such as a power key, a communication key, number keys, character keys, a direction key, a determination key, and a transmission key, to which various functions are allocated. When these keys operated by a user, the signals corresponding to the operation content are generated. The generated signals are input to the control part 22 as a command from the user.

The audio processing part 30 processes the audio signals that are input to the microphone 5 as well as the audio signals output from the receiver 6. The audio processing part 30 converts the sound input from the microphone 5 to predefined data and outputs it to the control part 22. With respect to the audio data transmitted from the control part 22, after the predefined conversion is performed, the data is output to the receiver 6.

The display part 32 comprises the main display 2M that is, for example, a Liquid Crystal Display (LCD, Liquid Crystal Display) or an organic EL (Organic Electro-Luminescence) panel. The display part 32 causes a video corresponding to the video data supplied and an image corresponding to the image data from the control part 22 to be displayed on the main display 2M.

The position detection sensor 34 is a detector that detects the position of the mobile communication device 1 (housing 1C). The position detection sensor 34 is a detector which uses various methods to detect position. For example, the position detection sensor 34 is a detector that detects the position by the combination of a gyro and an acceleration sensor having 3 axes, etc. The position detection sensor 34 detects the position of the mobile communication device 1 and transmits the detection results to the control part 22. The position detection sensor 34 may transmit the change information to the control part 22 according to the detection of changes in the position of the mobile communication device 1. The position detection sensor 34 may also detect the position for each fixed interval and transmit the information of the detected position to the control part 22, The position detection sensor 34 may also detect the information of the position, and transmit the detection results to the control part 22 according to the detection command of the information of the position is transmitted from the control part 22, it. The mobile communication device 1 is basically configured as above.

Figure 3:
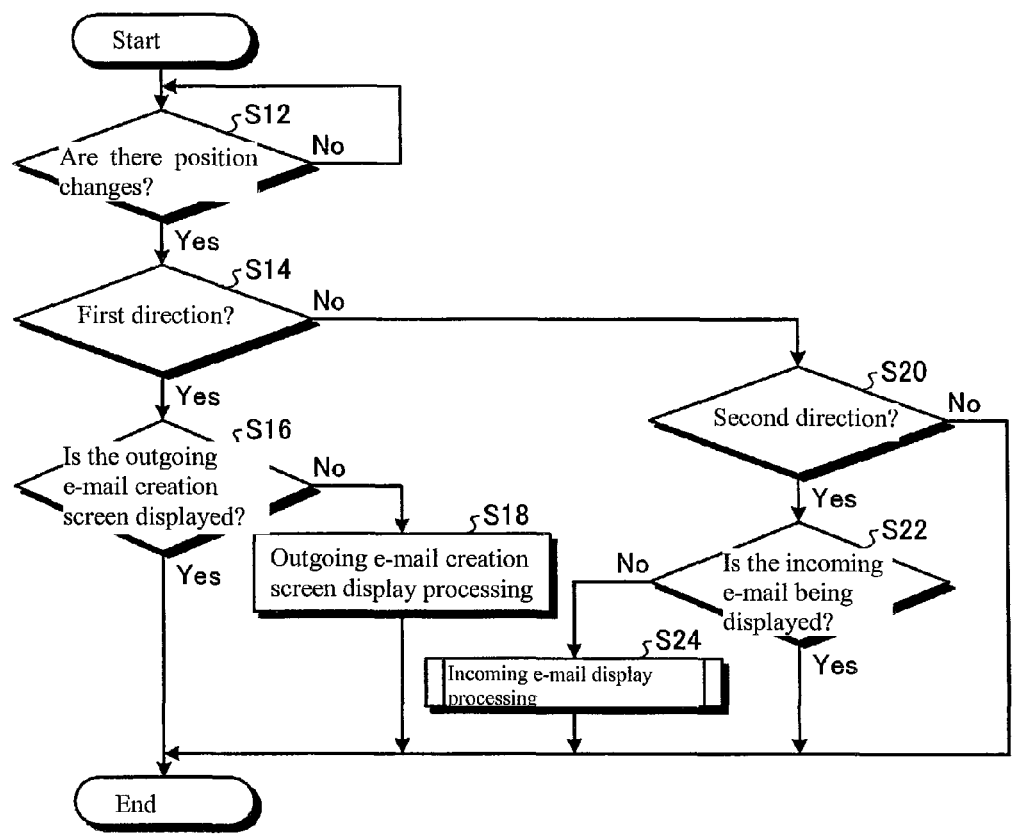
FIG. 3 is a flow diagram showing one example of the operation of the mobile communication device.
Figure 4A:
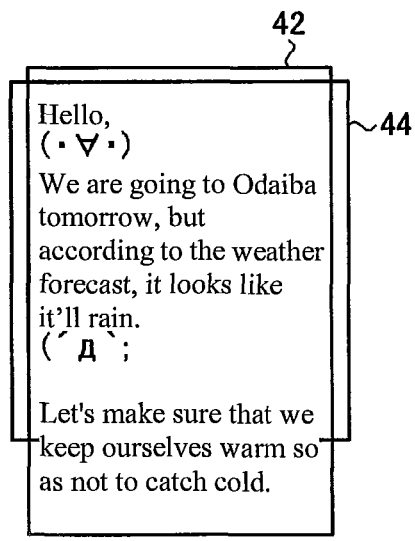
FIG. 4A is an explanatory diagram showing one example of the full text of an incoming message.
Figure 4B:
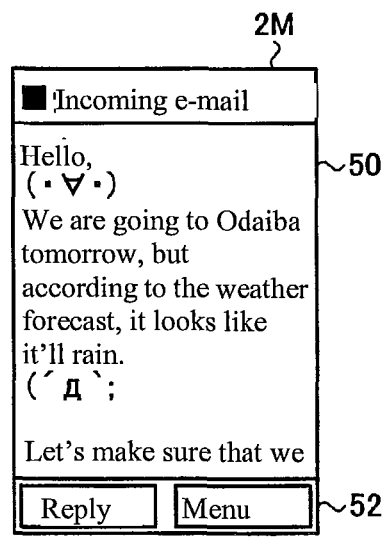
FIG. 4B is an explanatory diagram showing the state in which the incoming message shown in FIG. 4A is displayed on the mobile communication device.
Figure 5C:
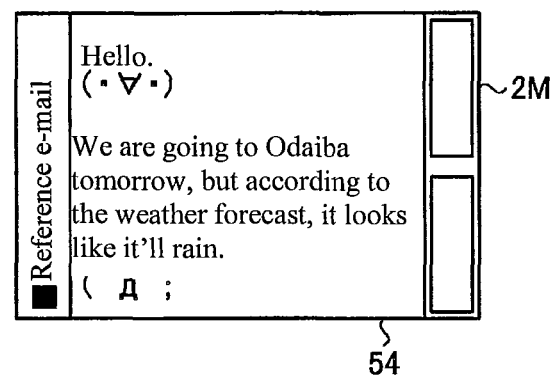
FIG. 5C is an explanatory diagram showing the state in which the incoming message is displayed on the mobile communication device.

Next, the operation of the mobile communication device 1 is described. Here, FIG. 3 is a flow diagram showing one example of the operation of the mobile communication device. FIG. 4A is an explanatory diagram showing one example of the full text of an incoming message. FIG. 4B is an explanatory diagram showing the state in which the incoming message shown in FIG. 4A is displayed on the mobile communication device. FIG. 5A is an explanatory diagram showing one example of the full text of an outgoing message. FIG. 5B is an explanatory diagram showing the state in which the outgoing message shown in FIG. 5A is displayed on the mobile communication device. FIG. 5C is an explanatory diagram showing the state in which the incoming message is displayed on the mobile communication device.

Here, the control part 22 of the mobile communication device 1 receives an incoming message and, while an outgoing reply message with respect to the incoming message is being composed, performs the processing of the operation of the flow diagram shown in FIG. 3. The operation shown in the flow diagram in FIG. 3 is executed according to the message application 24a processed by the control part 22 of the mobile communication device 1. In the present embodiment, a message that the mobile communication device 1 receives is referred to as an incoming message. A message composed at the mobile communication device 1 that is transmitted from the mobile communication device 1 is referred to as an outgoing message.

First, for the mobile communication device 1, when a message is transmitted from another communication device, the control part 22 initiates the message application 24a. After the message application 24a is initiated, the mobile communication device 1 receives messages through the transmitting and receiving part 26. After the incoming message is received, when the user inputs the operation for displaying the incoming message to the mobile communication device 1, the mobile communication device 1 causes the received message to be displayed on the display part 32. In the present embodiment, a text 42 shown in FIG. 4A is the full text of the body text of the incoming message. For the text 42 shown in FIG. 4A, the display area necessary for the display of the full text is larger than the display area of the main display 2M of the display part 32. Therefore, the control part 22 causes the text that is displayable on the section surrounded by an area 44, among the text 42 shown in FIG. 4A, to be displayed on the main display 2M. In this way, the control part 22, as shown in FIG. 4B, causes the section corresponding to the area 44, among the text 42, to be displayed on an area 50 of the main display 2M. The control part 22 causes the text of the body text of the incoming message to be displayed, and furthermore, causes the image corresponding to the operation to be displayed on an area 52 in case in which it causes the incoming message to be displayed on the area 50 of the main display 2M. The control part 22 may be constituted such that the information of the sender of the incoming message and the subject are also displayed.

The mobile communication device 1, in the state in which the incoming message is displayed, when a command to compose a reply message (outgoing message) is input, initiates the mode for composing an outgoing message (reply message), and causes the message creation screen to be displayed on the main display 2M. After the mobile communication device 1 initiates the mode for composing the outgoing message, it initiates the processing of the flow diagram shown in FIG. 3. First, the control part 22 of the mobile communication device 1, as at step S12, determines whether there are position changes, that is, determines whether the position has changed. The control part 22 can determine whether the position has changed based on the detection results of the position detection sensor 34.

If the control part 22 determines that there are no position changes (No) at step S12, that is, if it determines that the position is maintained in a fixed state, it proceeds to step S12. The control part 22, as a result of this, repeats the processing of step S12, until it detects a position change. The control part 22 can set various criteria as the criteria regarding whether or not the position has changed. For example, the control part 22 can determine that the position changed when the change in the direction of the housing 1C reaches a certain angle or greater.

If the control part 22 determines that there are position changes (Yes) at step S12, as at step S14, it determines whether or not the direction of the housing 1C that is detected in the position detection sensor 34 is a first direction. Here, what is meant by the first direction is that it refers to a predefined direction. If the control part 22 determines that it is in the first direction (Yes) at step S14, as at step S16, it determines whether the outgoing message creation screen is displayed.

If the control part 22 determines that the outgoing message creation screen is displayed (Yes) at step S16, it ends the current processing while displaying the outgoing message creation screen as is. If the control part 22 determines that the outgoing message creation screen is not displayed (No) at step S16, that is, if it determines that the incoming message is displayed, as at step S18, it performs the display processing of the outgoing message creation screen, causing the outgoing message creation screen to be displayed on the main display 2M, that is, it causes the outgoing message to be displayed instead of the incoming message, and ends the processing. That is, the control part 22 performs the switching processing of the display, which causes the outgoing message to be displayed instead of the incoming message. In case in which a text of outgoing message 50 shown in FIG. 5A is composed and in which the area 52 is set as the display area, the control part 22, as the display method of the outgoing message creation screen, for example as shown in FIG. 5B, causes the section contained in the area 52 among the text 50 to be displayed on an area 54 of the main display 2M. The control part 22 causes the full text to be displayed in case in which the full text of the outgoing message can be displayed simultaneously on the area 54 of the main display 2M.

If the control part 22 determines that it is not in the first direction (No) at step S14, as at step S20, it determines whether or not the housing 1C is in a second direction. The second direction is also a previously set direction. If the control part 22 determines that it is not in the second direction (No) at step S20, it ends the current processing. That is, if the control part 22 determines that it is neither in the first direction nor in the second direction, it ends the processing without switching the display screen.

If the control part 22 determines that it is in the second direction (Yes) at step S20, as at step S22, it determines whether or not the incoming message is being displayed. If the control part 22 determines that the incoming message is being displayed (Yes) at step S22, it ends the current processing, while leaving the incoming message displayed.

If the control part 22 determines that the incoming message is not being displayed (No) at step S22, that is, if it determines that the outgoing message is being displayed, as at step S24, it performs incoming message display processing, and causes the incoming message to be displayed on the main display 2M. That is, the control part 22 performs switching processing of the display, which causes the incoming message to be displayed instead of the outgoing message. Specifically, the control part 22, as the incoming message display processing, as shown in FIG. 5C, causes the incoming message to be displayed on the area 54 of the main display 2M. At this time, the control part 22 causes the text to be displayed on the area 54 to be displayed in the direction in which it is rotated 90 degrees from cases in which the outgoing message is displayed. That is, the text is displayed in the direction in which the vertical direction of the display screen of the outgoing message becomes the horizontal direction of the display part of the incoming message. FIG. 5C is an example of cases in which the incoming message shown in FIG. 4A, as described above, is set to be the incoming message to be displayed (reference message). The control part 22 performs the incoming message display processing of step S24, and ends the current processing after it causes the incoming message to be displayed on the main display 2M. The control part 22 repeats the processing shown in FIG. 3, while the outgoing message is being composed with respect to the incoming message.

The mobile communication device 1, as above, detects the direction of the housing 1C, and in case in which the first direction is detected, it causes the display part 32 to display the outgoing message (reply message) (performs a first display), and in cases in which the second direction is detected, it causes the display part 32 to display the incoming message (incoming message that is the subject of the reply message, the reference message) (performs a second display). Therefore, the user can cause the incoming message to be displayed while composing the outgoing message by simply changing the position of the mobile communication device 1, that is, without inputting an operation to the operation part 28. Therefore, the user can verify the content of the incoming message easily, while composing the outgoing message.

By switching the message to be displayed, the mobile communication device 1 can also cause the operation performed by the user easy while the respective messages are displayed. For example, for the mobile communication device 1, since the number of keys for the operation part is limited, in the state in which multiple messages are displayed, when the display of the respective messages are made so as to be operable, it is necessary to allocate the limited operation keys to the operation of the two screens, the operation becomes complex, and the operation which the user has to memorize increases. With respect to this, because the operation can be performed on the respective message display screen in the mobile communication device 1, it is possible to allocate the operation keys corresponding to each operation. For example, with respect to screen scrolling, the direction key can be allocated on the respective screens together; thereby, the operation is simplified.

The mobile communication device 1, as shown in FIG. 5B and FIG. 5C, can display both the incoming message and the outgoing message on a larger screen by causing the incoming message and the outgoing message to be displayed on the main display 2M by switching between them.

Here, the first direction and the second direction can be set to various settings. For example, the predefined range of the direction of the housing 1C can be set as the first direction and the second direction. It is preferable that the mobile communication device 1 set cases in which the longitudinal direction (a direction parallel to the long side of the main display) of the main display is the vertical direction, or cases in which the transverse direction (a direction parallel to the short side of the main display) of the main display is the horizontal direction, as the case in which the first direction is detected. It is preferable that the mobile communication device 1 set cases in which the longitudinal direction of the main display is the horizontal direction, or cases in which the transverse direction of the main display is the vertical direction, as the case in which the second direction is detected. Therefore, as is the case with the present embodiment, in cases in which the main display is in the vertical direction, the creation screen of the outgoing message is displayed, and in cases in which the main display is in the horizontal direction, the incoming message can be displayed. Therefore, both messages can be displayed in the direction that is easy for the user to read. Input to the operation part can be easily performed while the outgoing message is being composed.

The predefined range of the direction of the housing 1C may be set as the second direction, and other directions may be set as the first direction. The first direction and the second direction do not necessarily have to be absolute values, but may also be relative values. For example, the direction at the beginning of composing the outgoing message may be set as the first direction, and the direction that is inclined by a certain angle from the direction may be set as the second direction.

For the mobile communication device 1, as is the case with the present embodiment, it is preferable that the direction of characters to be displayed is rotated between the first display and the second display. Therefore, it can display characters on the main display 2M in the direction that is easy for the user to read. For the mobile communication device 1, the direction in which the characters are displayed may be set as the direction that is previously set with the first display and the second display; however, based on the detection results of the position detection sensor 34, the direction may be determined. For example, the vertical direction and the horizontal direction of the main display 2M may be detected by the position detection sensor 34, based on the result of the detection, the direction in which the vertical direction may become the vertical direction of the characters.

Figure 6:
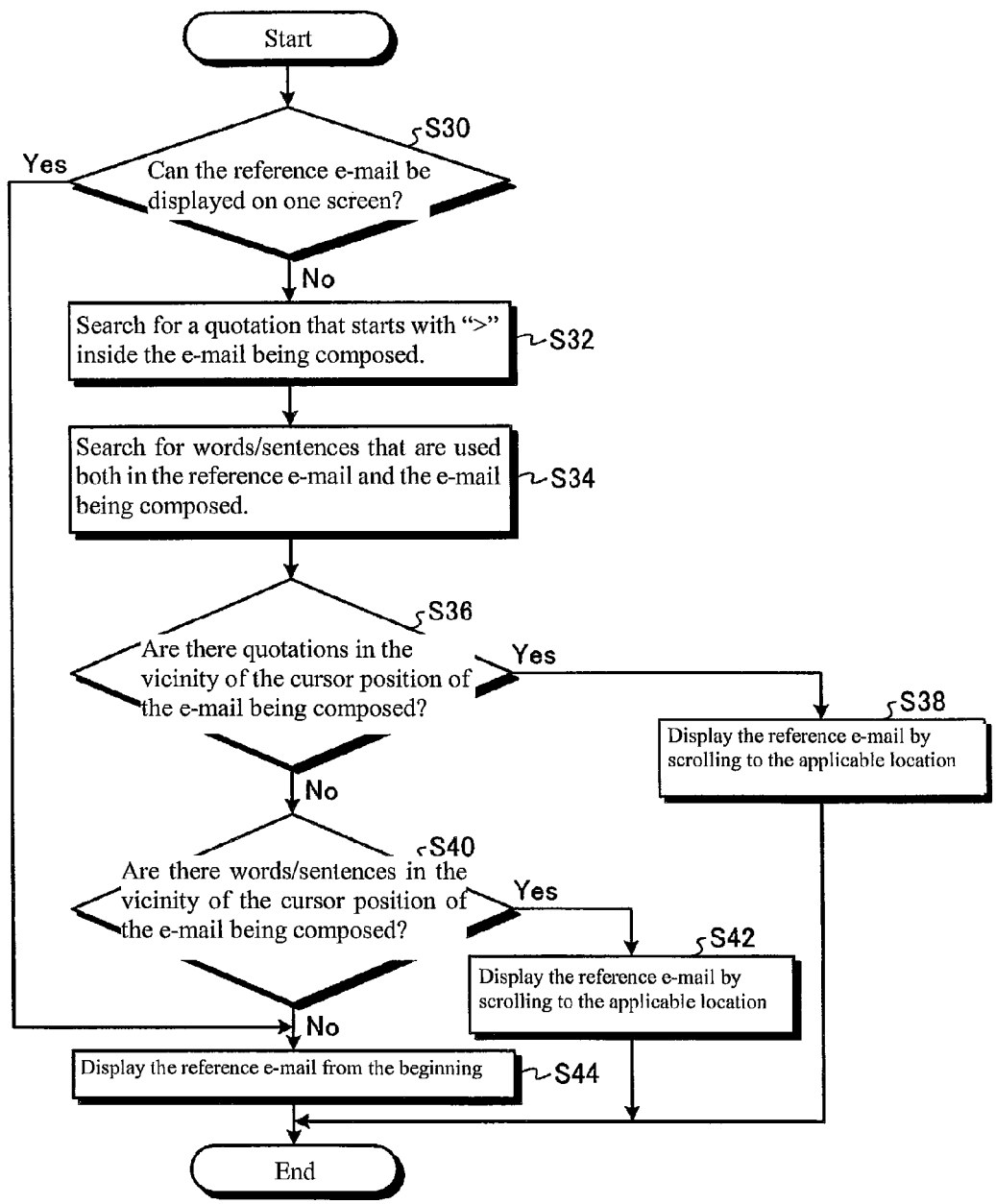
FIG. 6 is a flow diagram showing one example of operations of the mobile communication device.
Figure 7A:
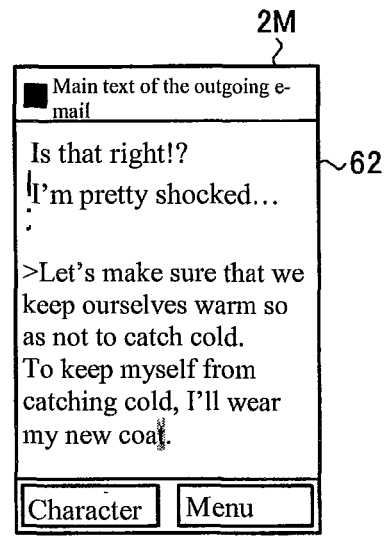
FIG. 7A is an explanatory diagram showing the state in which the outgoing message is displayed on the mobile communication device.
Figure 7B:
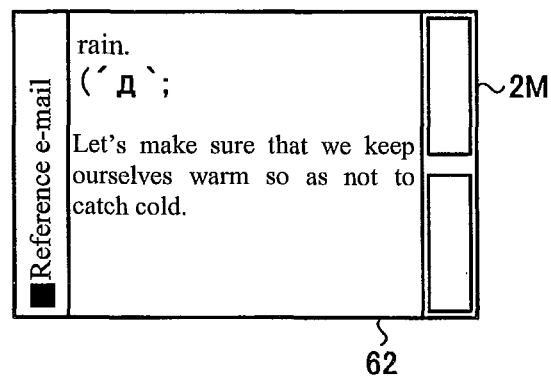
FIG. 7B is an explanatory diagram showing the state in which the incoming message is displayed on the mobile communication device.
Figure 8C:
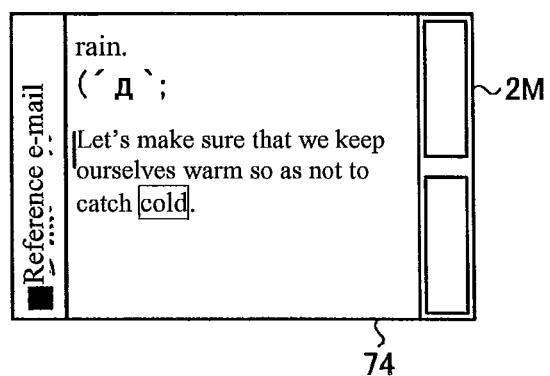
FIG. 8C is an explanatory diagram showing the state in which the incoming message is displayed on the mobile communication device.

In the above embodiment, the incoming message was displayed from the beginning of the sentence, with the incoming message display processing at step S24; however, the present invention is not limited to this. Below, one example of the incoming message display processing is explained using FIGS. 6 to 8C. Here, FIG. 6 is a flow diagram showing one example of the operation of the mobile communication device. FIG. 7A is an explanatory diagram showing the state in which the outgoing message is displayed on the mobile communication device. FIG. 7B is an explanatory diagram showing the state in which the incoming message is displayed on the mobile communication device. FIG. 8A is an explanatory diagram showing one example of the full text of the outgoing message. FIG. 8B is an explanatory diagram showing the state in which the outgoing message shown in FIG. 8A is displayed on the mobile communication device. FIG. 8C is an explanatory diagram showing the state in which the incoming message is displayed on the mobile communication device. Below, the incoming message is referred to as the reference message.

When the control part 22 initiates display processing of the reference message, as at step S30, it determines whether or not the reference message can be displayed on one screen. That is, it determines whether the full text of the reference message is of a size (length) that can be displayed simultaneously on the main display 2M. If the control part 22 determines that the reference message can be displayed on one screen (Yes) at step S30, it proceeds to step S44.

If the control part 22 determines that the reference message cannot be displayed on one screen (No) at step S30, as at step S32, it searches for a quotation that starts with ">" inside the message being composed (outgoing message) and, as at step S34, it searches for words/sentences that are used both in the reference message and the message being composed (outgoing message).

The control part 22, after the processing of step S34 is completed, as at step S36, determines whether or not there are quotations in the vicinity of the cursor position of the message being composed. In the present embodiment, the vicinity of the cursor position is defined to be 2 sentences before and after the cursor position.

If the control part 22 determines that there are quotations (Yes) at step S36, as at step S38, it causes the reference message to be displayed by scrolling to the applicable location. That is, the control part 22 detects at step S32, sets the quotation identified at step S36 as the applicable location, extracts the area in which the applicable location is displayed on the display part 32, and causes the extracted area to be displayed on the main display 2M.

For example, as shown in FIG. 7A, in an area 62 of the main display 2M, the main text of the outgoing message is displayed. The outgoing message shown in FIG. 7A is a reply message with respect to the incoming message in the above FIG. 4A. That is, the incoming message from FIG. 4A becomes the reference message. Here, in the area 62, a cursor is placed on "t" of "my new coat". In this state, in case in which the reference message is displayed, the control part 22 searches for ">", which is located 2 sentences before the cursor position, and detects the sentence, namely "Let's make sure that we keep ourselves warm so as not to catch cold.", as the quotation. After the control part 22 detects the quotation, it detects the same sentence as the quotation or the corresponding sentence from the reference message (incoming message), and causes the section containing the detected sentence to be displayed on the area 62, as shown in FIG. 7B. After the control part 22 causes the reference message to be displayed at step S38, it ends the current processing.

Next, if the control part 22 determines that there are no quotations (No) at step S36, as at step S40, it determines whether or not there are words/sentences (that are used in both messages) in the vicinity of the cursor position in the message being composed. If the control part 22 determines that there are words/sentences (Yes) at step S40, as at step S42, it causes the reference message to be displayed by scrolling to the applicable location. That is, the control part 22, among the reference messages, detects at step S34, sets the section containing the words/sentences identified at step S38 as the applicable section, extracts the area in which the identified applicable section is displayed on the display part 32, and displays the extracted area on the main display 2M.

For example, as shown in FIG. 8A, a text 70 of the outgoing message is composed. Among the text 70, an area 72 is the area for the display subject, and for the control part 22, as shown in FIG. 8B, a section of the main text of the outgoing message is displayed in an area 74 of the main display 2M. The outgoing messages shown in FIG. 8A and FIG. 8B are also reply messages with respect to the incoming message described in FIG. 4A. That is, the incoming message from FIG. 4A becomes the reference message. Here, in the area 74, the cursor is placed on "t" of "my new coat." In this state, in case in which the reference message is displayed, the control part 22 detects "cold," from the sentence on which the cursor position is located. That is, "cold" is detected as the common word in both the outgoing message and the incoming message. After the control part 22 detects "cold," it detects sentences containing "cold" from the reference message (incoming message), and causes the section containing the detected sentences to be displayed on the area 74, as shown in FIG. 8C. After the control part 22 causes the reference message to be displayed at step S42, it ends the current processing.

If the control part 22 determines that there are no words/sentences (No) at step S40, or if it determines Yes at step S30, as at step S44, it causes the reference message to be displayed from the beginning, and ends the current processing.

The mobile communication device 1, as shown in FIG. 6, detects the section corresponding to the sentence being composed in the outgoing message, and by causing the section corresponding to the detected section to be displayed, from the reference message (incoming message), it can verify the necessary section in a short period of time. It can further decrease the time and effort of the user in scrolling for the reference message.

In the above embodiment, the mobile communication device 1 detected both the quotation and the common words/sentences; however, it may detect either one. In the above embodiment, the mobile communication device 1 searched for the quotation based on ">"; however, it is not limited to this, and the quotation may be identified based on other symbols representing the quotation or based on the entire sentence. At the beginning of composing the outgoing message, the mobile communication device 1 may store the quotation by associating the quotation and identify it based on the memory.

Figure 9:
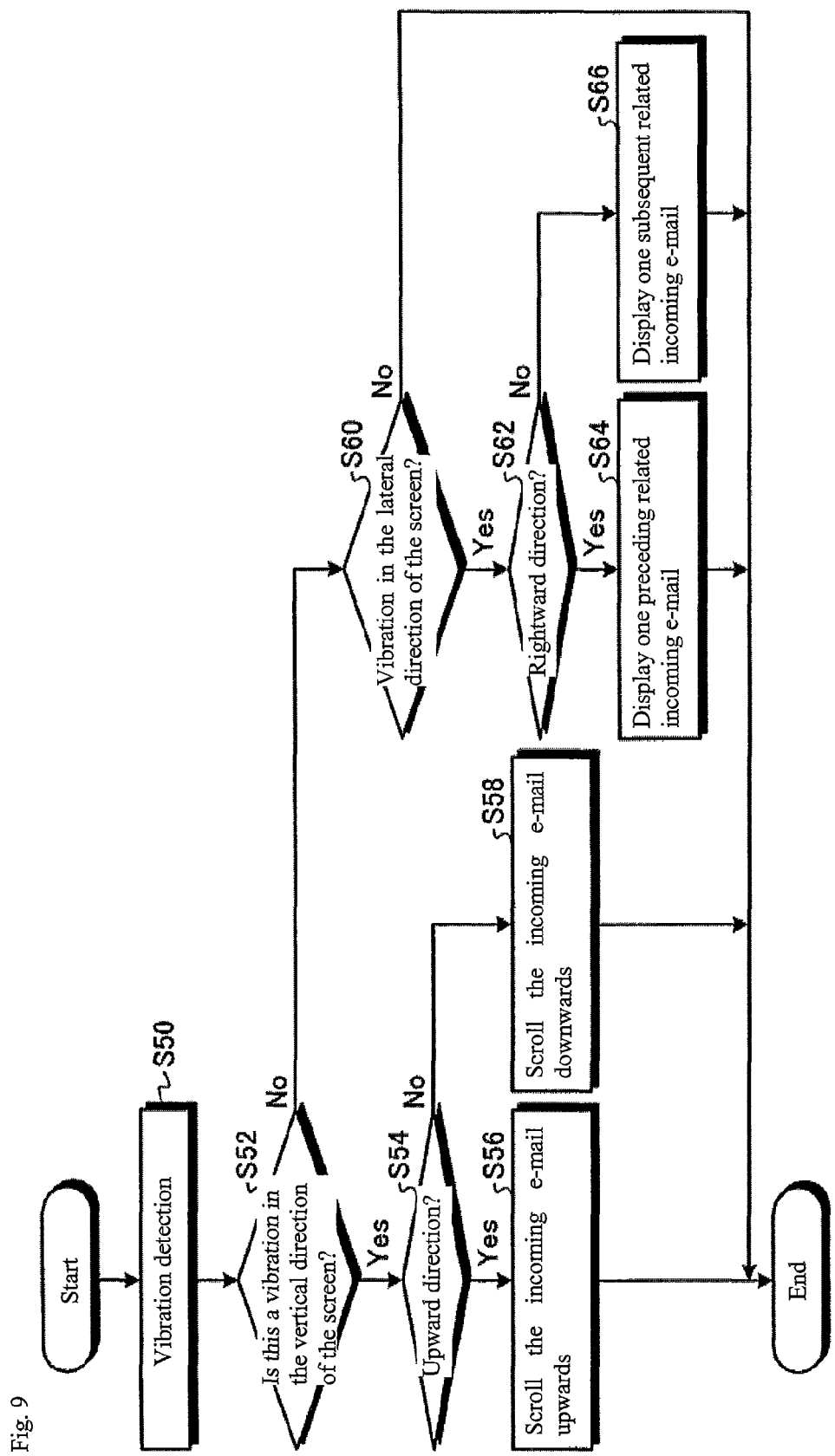
FIG. 9 is a flow diagram showing one example of the operation of the mobile communication device.
Figure 10A:
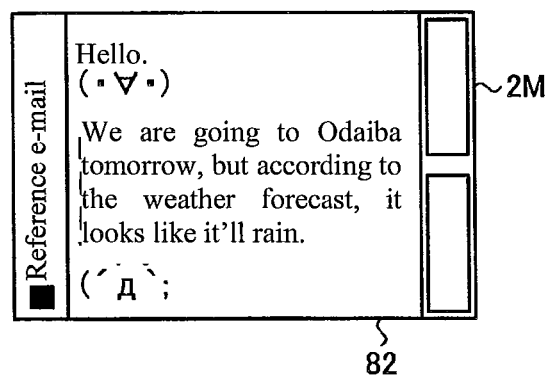
FIG. 10A is an explanatory diagram showing the state in which the incoming message is displayed on the mobile communication device.
Figure 10B:
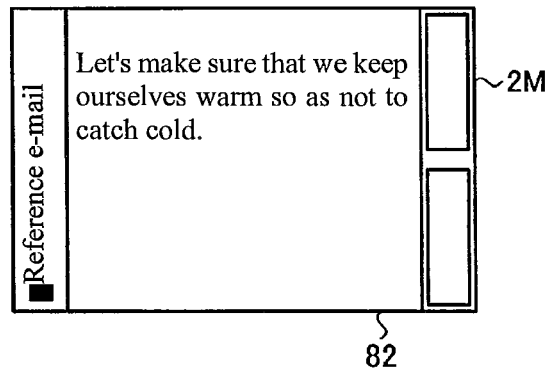
FIG. 10B is an explanatory diagram showing the state in which the incoming message is displayed on the mobile communication device.

The mobile communication device 1, while displaying the incoming message (reference message), may detect a vibration (shift) in the housing and, based on the vibration direction, may operate the incoming message to be displayed. The vibration and the shift of the housing can be calculated based on the detection results of the position detection sensor 34. Below, the present embodiment is described in detail using FIG. 9, FIG. 10A, and FIG. 10B. Here, FIG. 9 is a flow diagram showing one example of the operation of the mobile communication device. FIG. 10A and FIG. 10B are explanatory diagrams showing the state in which the incoming message is displayed on the mobile communication device.

For the control part 22, while the incoming message is displayed on the main display 2M (while executing the second display), when it detects a vibration at step S50, as at step S52, it determines whether or not it is a vibration in the vertical direction of the screen. That is, the control part 22 determines whether the direction in which the housing 1C shifted is in the vertical direction of the screen displayed on the main display 2M. If the control part 22 determines that it is a vibration in the vertical direction (Yes) at step S52, as at step S54, it determines whether the vibration is upwards (vibration in the upward direction of the screen). If the control part 22 determines that it is an upwards vibration (Yes) at step S54, as at step S56, it scrolls the incoming message upwards. If the control part 22 determines that it is not an upwards vibration (No) at step S54, that is, if it determines that it is a downwards vibration (in the downward direction of the screen), as at step S58, it scrolls the incoming message downwards. For example, as shown in FIG. 10A, in the state in which the section of the upper side of the incoming message is displayed in an area 82 of the main display 2M, when the housing is caused to be vibrated to the lower side, the control part 22, as at step S58, as shown in FIG. 10B, shifts the display of the screen to the state in which the section of the lower side of the incoming message is displayed in the area 82 of the main display 2M. In contrast, for the control part 22, in the state in which the screen of FIG. 10B is displayed on the main display 2M, when the housing is caused to be vibrated upwards, the screen to be displayed on the main display 2M is switched to the screen of FIG. 10A. After the control part 22 completes the processing of step S56 or step S58, it ends the current processing.

If the control part 22 determines that it is not a vibration in the vertical direction (No) at step S52, as at step S60, it determines whether or not it is a vibration in the lateral direction of the screen. That is, the control part 22 determines whether the direction in which the housing 1C shifted is the lateral direction of the screen that is displayed on the main display 2M. If the control part 22 determines that it is a vibration in the lateral direction (Yes) at step S60, as at step S62, it determines whether or not the vibration is in the rightward direction (vibration in the rightward direction of the screen). If the control part 22 determines that it is a vibration in the rightward direction (Yes) at step S60, as at step S64, it causes one preceding related incoming message to be displayed. If the control part 22 determines that it is not a vibration in the rightward direction (No) at step S62, that is, if it determines that it is a vibration in the leftward direction (in the leftward direction of the screen), as at step S66, it causes one subsequent related incoming message to be displayed. Here, what is meant by the related incoming message is that it refers to the incoming message in which the association is stored. For example, in case in which the messages are transmitted and received multiple times with the same intended party, using the outgoing message creation function, the related incoming message refers to the multiple incoming messages that are stored in the incoming folder 24b. By mapping these multiple incoming messages in the order received, they may be referred to as related incoming messages. A sender may define the incoming message in which the sender of the incoming message is the same as the related incoming message. The control part 22, after the processing at step S64 or step S66 is complete, ends the current processing. The control part 22, even in case in which it determines that it is not a vibration in the lateral direction (No) at step S60, ends the current processing.

In this way, based on the vibration of the housing, by scrolling (shifting) the display position of the incoming message, the user can shift the display area of the incoming message even without inputting the operation to the operation part. Therefore, because the housing is inclined while the outgoing message is being displayed, the user can easily scroll the screen even in case in which the operation for the operation part is difficult to input.

Based on the vibration of the housing, by making it possible to switch the incoming message to be displayed to other related incoming messages, past correspondences can be easily understood, and outgoing messages can be more easily composed. In the above embodiment, it was set such that switching was performed only on the incoming message; however, it may be set such that the related outgoing message sent prior to the incoming message is alternately displayed. That is, in a series of correspondences, the transmitted message and the received message may be displayed alternately.

The control part 22 may not have to switch the display in case in which there are no areas to scroll at step S56 and S58, when there are no related incoming messages at step S64 and S66. For the control part 22, mapping between the amount of the vibration in the housing and the amount of the screen scrolled can be set to various values. For example, if the housing is vibrated once, the screen may be scrolled by one page, or according to the amount of the vibration of the housing, the amount of the screen scrolled may be switched.

In the above embodiment, for the mobile communication device 1, the shifting (switching) of the display area in one incoming message and the switching of the incoming message to be displayed were both performed; however, it may be set such that either one may be performed alone. In case in which both are to be performed, as is the case with the present embodiment, it is preferable that the scroll direction of the screen and the shift direction of the housing are in the same direction. That is, with the mobile communication device 1, in case in which sentences are written horizontally, it is preferable that the screen is scrolled after it is vibrated in the vertical direction of the screen. In this way, the user can perform the operation intuitively.

The mobile communication device 1 is not limited to the abovementioned folding-type mobile communication device but, as described above, can be used for mobile communication devices of various shapes. Regardless of the shape, it is preferable that the direction in which the user can easily input characters to the operation part is set to be the first direction. For example, it is preferable that the direction of the housing in which the vertical direction of the operation part becomes the vertical direction, and the horizontal direction of the operation part becomes the horizontal direction is set to be the first direction. In this way, the user can easily operate the operation part when composing the outgoing message.

In the abovementioned embodiment, the mobile communication device 1 changes the display between the incoming message and the reply message that corresponds to the incoming message. However, the present invention is not limited the embodiment. That is, the mobile communication device 1 may include the configuration that display the two messages which are related each other. Specifically, the mobile communication device 1 may change the display between an message sent by the user and a reply message that corresponds to the message sent by the user. Also, the mobile communication device 1 may change the display between an incoming message and a transmitted message that corresponds to a reply message that corresponds to the incoming message.

Next, using FIG. 11A, FIG. 11B, FIG. 11C, FIG. 11D, and FIG. 11E, a mobile phone 100, which is another embodiment of the present invention, is described.

Figure 11A:
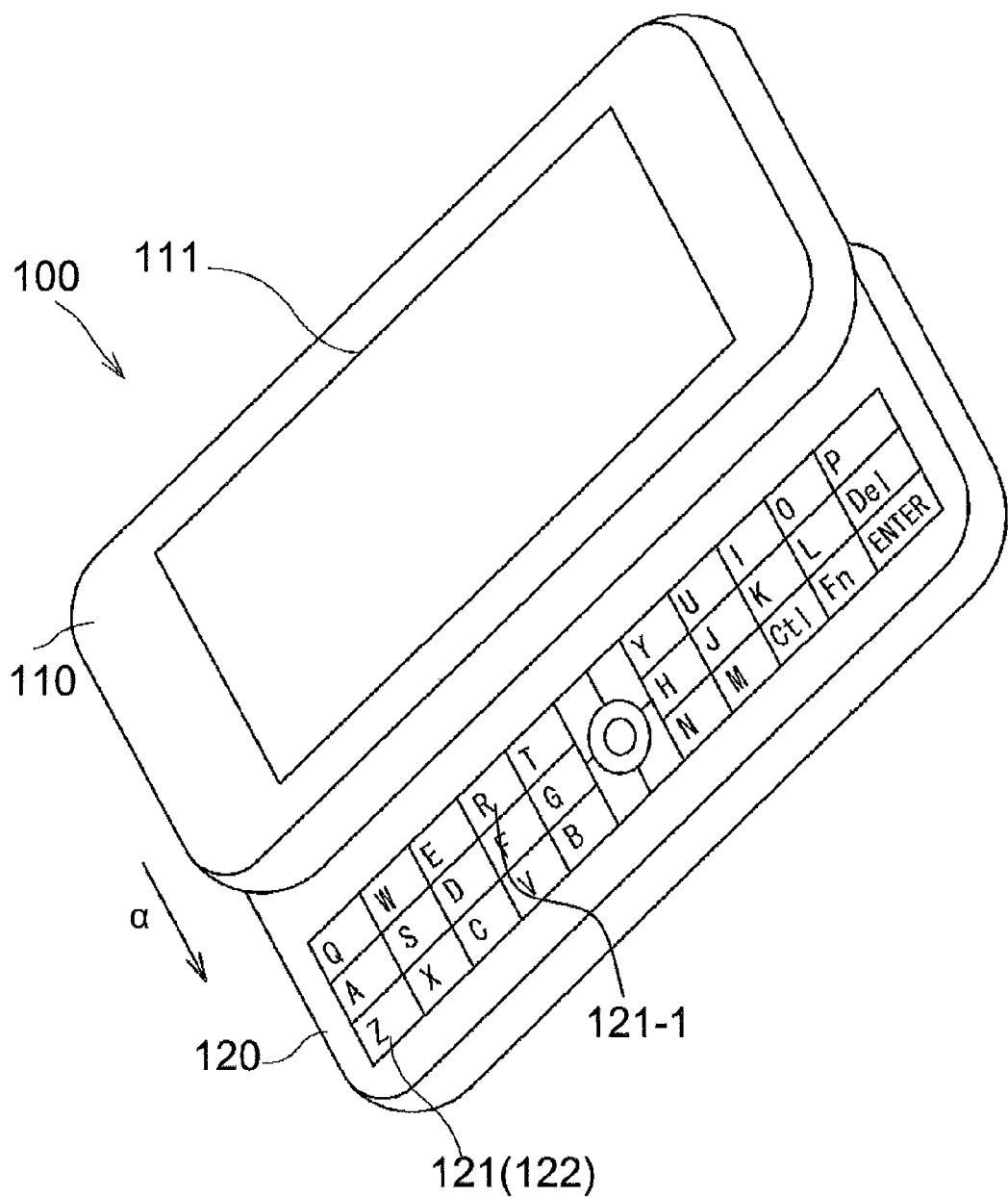
FIG. 11A is an external view of the mobile communication device.
Figure 11B:
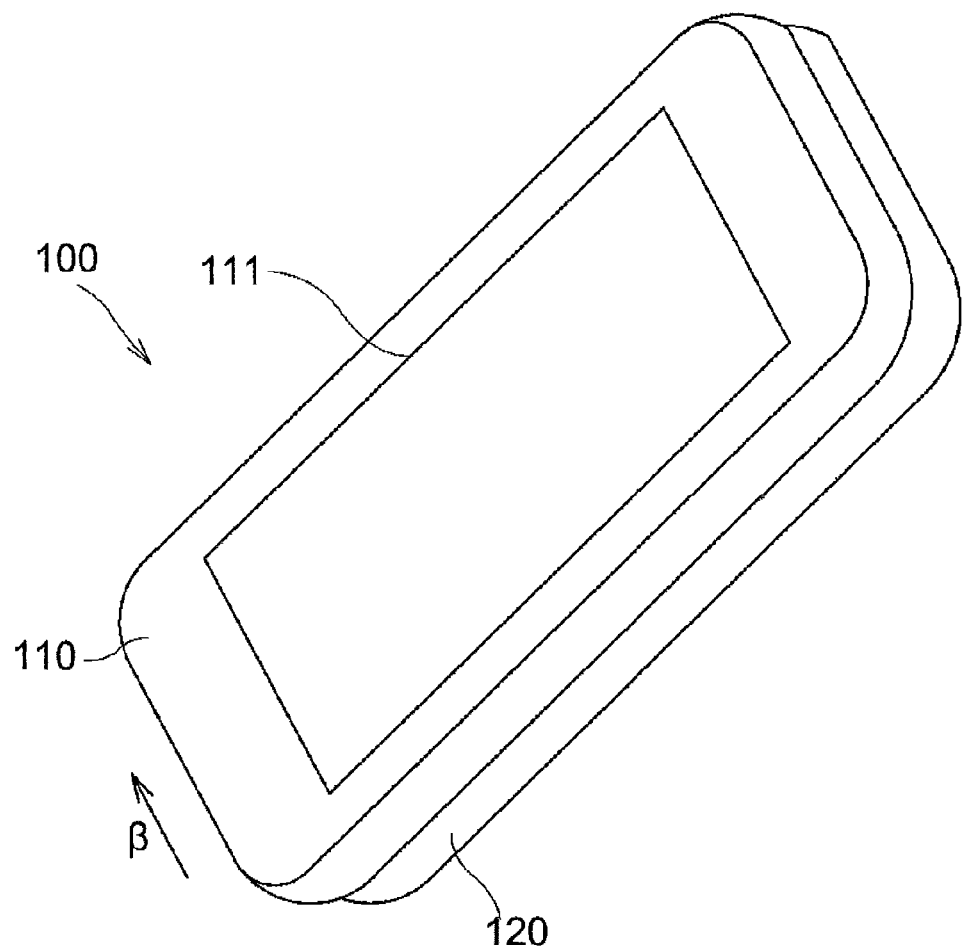
FIG. 11B is an external view of the mobile communication device.

FIG. 11A and FIG. 11B are external views of the mobile phone 100. The mobile phone 100 comprises a first housing 110; a second housing 120; and a sliding mechanism that connects the first housing 110 and the second housing 120.

The first housing 110 is of a flat plate shape and comprises a first display 111 above its surface. The second housing 120 is of nearly the same shape as the first housing 110 and comprises operation keys 121 above its surface.

The sliding mechanism connects the first housing 110 and the second housing 120. The relative positional relationship between the first housing 110 and the second housing 120 can be changed by the sliding mechanism. Specifically, the mobile phone 100 is either in an open state in which some of the first housing 110 and some of the second housing 120 overlap each other via the sliding mechanism (the state shown in FIG. 11A), or in a closed state in which nearly all of the first housing 110 and nearly all of the second housing 120 overlap each other (the state shown in FIG. 11B).

That is, via the sliding mechanism, it is possible for the first housing 110 to shift in parallel with respect to the second housing 120, in the direction of the arrow α in FIG. 11A and in the direction of the arrow β in FIG. 11B.

Furthermore, the mobile phone 100 comprises a tilt sensor inside the housings. The tilt sensor is a sensor that detects how much the mobile phone 100 is inclined with respect to the vertical direction of the horizontal plane. Specifically, the tilt sensor can distinguish the case in which the long side of the first housing 110 is in parallel in the vertical direction of the horizontal plane (cases shown in FIG. 11C) from the other case in which the short side of the first housing 110 is in parallel in the vertical direction of the horizontal plane (cases shown in FIG. 11D).

Figure 11C:
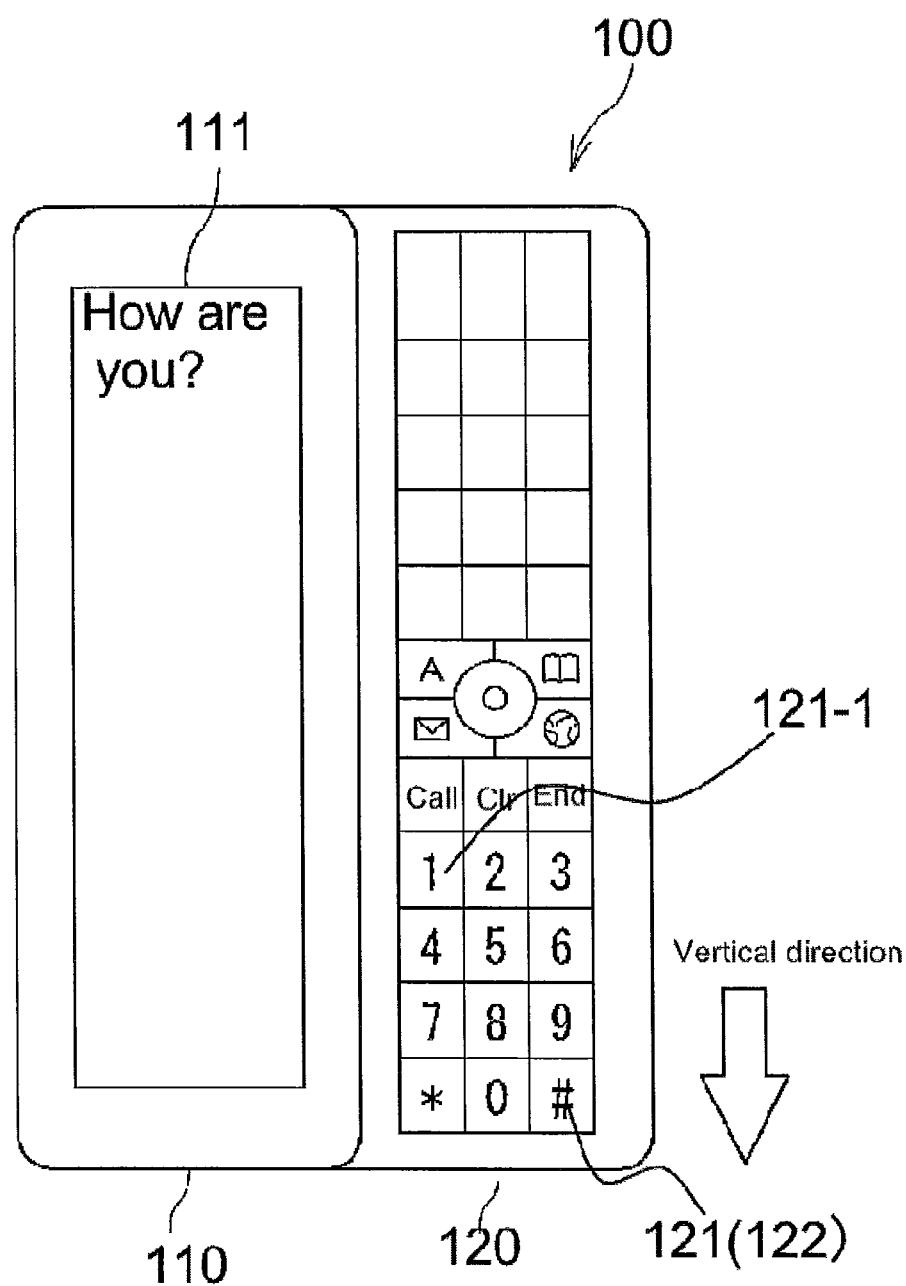
FIG. 11C is an external view of the mobile communication device.
Figure 11D:
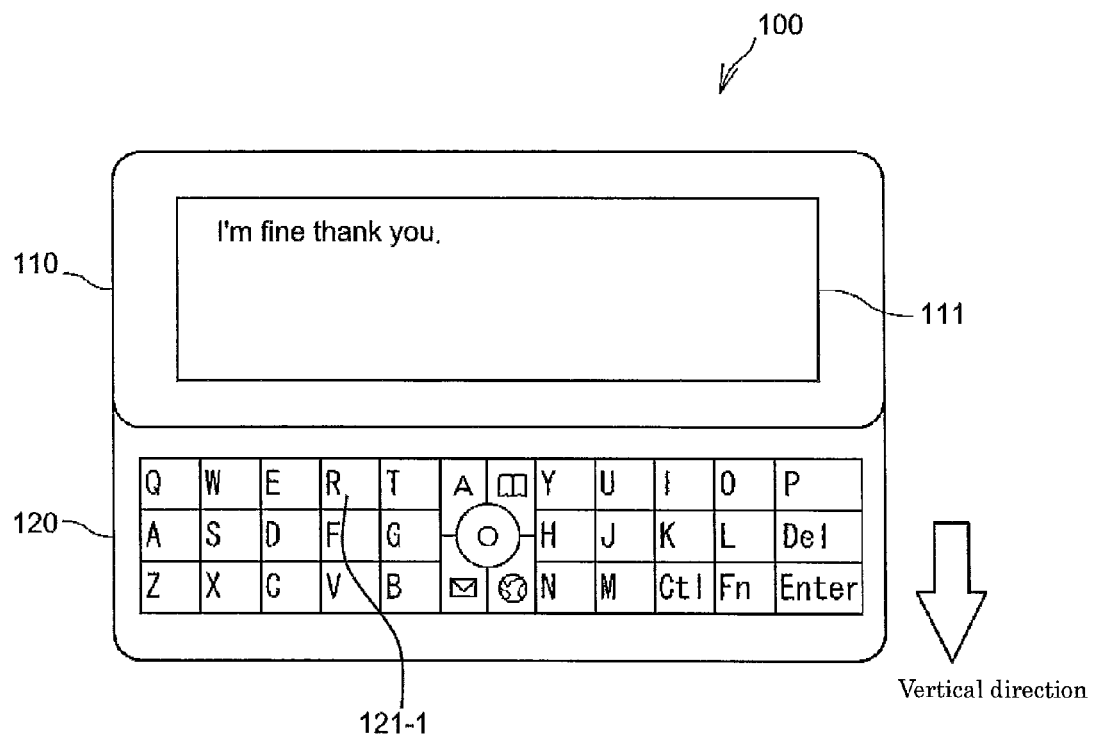
FIG. 11D is an external view of the mobile communication device.

Below, in the case in which the long side of the first housing 110 is in parallel in the vertical direction of the horizontal plane, as shown in FIG. 11C, the direction of the mobile phone 100 is described as the "vertical direction," and in the other case in which the short side of the first housing 110 is in parallel in the vertical direction of the horizontal plane, as shown in FIG. 11D, the direction of the mobile phone 100 is described as the "horizontal direction."

Inside the mobile phone 100, a control section 22 shown in the previous embodiment is provided.

The operation keys 121 comprise multiple key switches. These key switches are formed, for example, by a physical key such as a metal dome switch. Furthermore, each of the multiple key switches comprises a second display 122, which is different from the first display 111, on the surface. That is, in case in which the user operates the operation keys 121, the user operates the operation keys 121 by pressing the second displays 122.

The display of these multiple second displays 122 is controlled by the control section 22, according to the direction of the mobile phone 100, which is distinguished by the above-mentioned tilt sensor. Specifically, in case in which the direction of the mobile phone 100 is in the vertical direction, each of the multiple second displays 122, as shown in FIG. 11C, displays numbers from "0" to "9," symbols such as "*" and "#," an on-hook key, and an off-hook key. That is, each of the multiple second displays 122 displays the operation buttons (numeric keys) in case in which the mobile phone 100 is in the vertical direction.

In case in which the direction of the mobile phone 100 is in the horizontal direction, each of the multiple second displays 122, as shown in FIG. 11D, displays the alphabetical characters "A" to "Z," etc. That is, each of the multiple second displays 122 displays a qwerty keys, which are appropriate for character input, in case in which the mobile phone 100 is in the horizontal direction.

The control section 22 changes the control according to the display of the second displays 122 at the time the pressing force is detected in case in which the operation keys 121 detect the pressing force. Specifically, a key switch 121-1 displayed as "1," shown in FIG. 11C, displays "R" as shown in FIG. 11D in case in the horizontal direction. In case in which the direction of the mobile phone 100 is in the vertical direction, when the key switch 121-1 is pressed, the control section 22 performs control which is the related control in case in which "1" is input. In case in which the direction of the mobile phone 100 is in the horizontal direction, when the key switch 121-1 is pressed, the control section 22 performs control which is the related control in case in which "R" is input.

The control section 22 changes the display of the first display 111 according to the direction of the mobile phone 100. Specifically, the control section 22 displays the incoming message on the first display 111 in case in which the direction of the mobile phone 100 is in the vertical direction. The control section 22 displays a reply message that corresponds to the incoming message on the first display 111 in case in which the direction of the mobile phone 100 is in the horizontal direction.

Figure 11E:
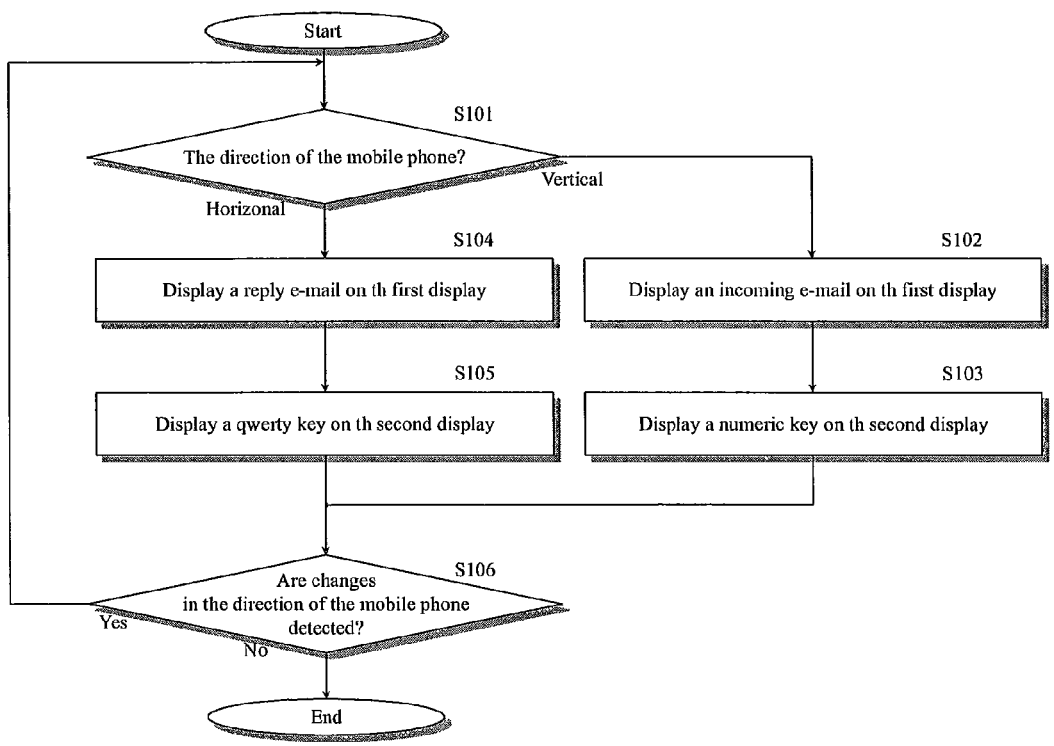
FIG. 11E is a flow chart showing the flow of the control.

Next, using FIG. 11E, the control with respect to the mobile phone 100 of the control section 22 is described. FIG. 11E is a flow chart showing the flow of the control of the control section 22.

First, the control section 22 detects the direction of the mobile phone 100 with the tilt sensor (S101).

At this time, if it is detected by the tilt sensor that the direction of the mobile phone 100 is in the vertical direction, the control section 22 displays the incoming message on the first display 111, while displaying a key of the telephone on the second displays 122 (S102, S103).

If it is detected by the tilt sensor that the direction of the mobile phone 100 is in the horizontal direction, the control section 22 displays a reply message that corresponds to the incoming message on the first display 111, while displaying a qwerty key on the second displays 122 (S104, S105).

The control section 22 displays the display corresponding to the operation of the qwerty key to the first display 111 in case in which the qwerty key is displayed on the second displays 122 when the operation is performed with respect to the operation keys 121. Specifically, in the state of step S105, in case in which the key switch 121-1 is operated, the control section 22 determines that an input, namely "R" is performed, and it displays the "R" on the first display 111.

Following the processing of S105 or S103, the control section 22 detects the direction of the mobile phone 100 using the tilt sensor again, and initiates the processing of step S101 in case in which it detects the direction of the mobile phone 100, and ends the processing (S106) in case in which it does not detect the direction of the mobile phone 100.

As above, the present invention according to this type of embodiment provides the following effects.

That is, by placing the direction of the mobile phone 100 in the horizontal direction, the user of the mobile phone 100 can compose a reply message with the appropriate character input key, namely the qwerty key. By placing the mobile phone 100 in the vertical direction, the user can view the incoming message in case in which the user wants to verify the corresponding incoming message while composing the reply message.

Specifically, as shown in FIG. 11D, the user can verify the incoming message simply by placing the mobile phone 100 in the vertical direction, as shown in FIG. 11C, in case in which the reply message is composed in the horizontal direction, when the user forgets the content of the incoming message.

Therefore, the user can verify the incoming message, namely "How are you?", simply by placing the mobile phone 100 in the vertical direction; hence, a sentence, namely "I'm fine thank you," which is a reply message with respect to the incoming message, can be composed with the operation keys 121 that performed the display of the qwerty key.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile communication device comprising:
   a housing;
   a communication part that transmits and receives messages;
   a display part that displays a first message, or a second message that is related to the first message;
   a detection part that detects a change in a state of the housing, wherein the change comprises a shift direction in the housing; and
   a control part that displays the second message on the display part, in a display direction of the second message that is different from a display direction of the first message in case in which the detection part detects a change in the state of the housing when the display part displays the first message,
   wherein the control part changes the display part of the displayed second message as a shift of the housing in a first direction of the housing is detected by the detection part,
   and changes the second message for displaying on the display as a shift of the housing in a direction perpendicular to the first direction is detected by the detection part when one of a plurality of second messages is displayed on the display part.

2. The mobile communication device according to claim 1, wherein the second message is an incoming message that is received by the communication part, and the first message is a reply message corresponding to the incoming message.

3. The mobile communication device according to claim 2, wherein the control part displays the second message based on sections of the first message in case in which the detection part detects a change in the state of the housing when the first message is being composed.

4. The mobile communication device according to claim 3, wherein the control part displays the second message according to characters that are input to the first message.

5. The mobile communication device according to claim 4, wherein the control part displays the part of the second message which includes sentences of the first message.

6. The mobile communication device according to claim 2, further comprising an operation part configured to detect an operation,
   wherein the detection part is further configured to detect a tilt of the housing with respect to a plane that is horizontal to the display direction of the second message,
   wherein the control part reflects a first input to the first message according to an operation detected by the operation part when the detection part detects a first tilt, and reflects a second input which is different from the first input to the second message according to an operation detected by the operation part when the detection part detects a second tilt which is different from the first tilt.

7. The mobile communication device according to claim 6, wherein the first tilt is horizontal direction with respect to the horizontal plane, and the second tilt is vertical direction with respect to the horizontal plane.

8. The mobile communication device according to claim 1, wherein the first message is a message in the process of being composed that is associated with the second message.

9. The mobile communication device according to claim 1, wherein the detection part detects changes in the position of the housing, as changes in the state.

10. The mobile communication device according to claim 1, wherein the display direction of the first message varies by 90 degrees, compared to the display direction of the second message.

11. The mobile communication device according to claim 1, wherein the display part is rectangular,
    the display direction of the first message is the direction in which a longitudinal direction of the display part is a vertical direction, and the display direction of the second message is the direction in which a transverse direction of the display part is the vertical direction.

12. The mobile communication device according to claim 1,
wherein the control part determines a display mode of the second message that is displayed on the display part based on a display state of the first message in case in which the detection part detects a change in the state of the housing when the first message is displayed on the display part.

13. The mobile communication device according to claim 1,
wherein the control part causes the first message to be displayed on the display part in case in which the detection part detects a change in the state of the housing when the second message is displayed on the display part.

14. The mobile communication device according to claim 13,
wherein
the control part causes the display of the display part to be changed according to the shift direction of the housing that is detected by the detection part.

15. The mobile communication device according to claim 14,
wherein the control part scrolls through in the shift direction of the housing page by page.

16. A display method for a mobile communication device having a housing, a display part that is disposed in the housing, a detection part that detects a state of the housing, and a communication part that receives messages, the display method comprising:
detecting a state of the housing;
displaying a first message and a second message, the second message is displayed in case in which the detection part detects a change in a state of the housing, wherein the change comprises a shift direction in the housing;
changing the display part of the displayed second message as a shift of the housing in a first direction of the housing is detected by the detection part; and
changing the second message for displaying on the display as a shift of the housing in a direction perpendicular to the first direction is detected by the detection part when one of a plurality of second messages is displayed on the display part.

17. A non-transitory computer readable medium storing a display program for a mobile communication device having a housing, a display part that is disposed in the housing, a detection part that detects state of the housing, and a communication part that receives messages, the display program comprising:
detecting a state of the housing;
displaying a first message and a second message, the second message is displayed in case in which the detection part detects a change in a state of the housing, wherein the change comprises a shift direction in the housing;
changing the display part of the displayed second message as a shift of the housing in a first direction of the housing is detected by the detection part; and
changing the second message for displaying on the display as a shift of the housing in a direction perpendicular to the first direction is detected by the detection part when one of a plurality of second messages is displayed on the display part.

18. A mobile communication device comprising:
a housing;
a communication part that transmits and receives messages;
a display part that displays a first message or a second message that is related to the first message, wherein the second message is an incoming message that is received by the communication part, and the first message is a reply message corresponding to the incoming message;
a detection part that detects a change in a state of the housing; and
a control part that displays the second message on the display part, in a display direction of the second message that is different from a display direction of the first message in case in which the detection part detects a change in the state of the housing when the display part displays the first message, wherein the control part displays the second message based on sections of the first message in case in which the detection part detects a change in the state of the housing when the first message is being composed.

19. The mobile communication device according to claim 7,
wherein the operation part functions as qwerty keys when the detection part detects the first tilt, and functions as numeric keys when the detection part detects the second tilt.

20. The mobile communication device according to claim 19, further comprising a second display part;
wherein the second display part displays information indicating the operation part functions as qwerty keys when the detection part detects the first tilt, and displays information indicating the operation part functions as numeric keys when the detection part detects the second tilt.

* * * * *